United States Patent
Phan et al.

(10) Patent No.: US 9,558,518 B2
(45) Date of Patent: Jan. 31, 2017

(54) METHOD, SYSTEM, AND COMPUTER-READABLE MEDIUM FOR BANDWIDTH AUCTIONS WITH BANDWIDTH BID REQUESTS BASED MOBILE DEVICE APPLICATION TABLES

(75) Inventors: Wei Yeu Phan, Singapore (SG); Tralvex Yeap, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1042 days.

(21) Appl. No.: 13/643,273

(22) PCT Filed: Dec. 29, 2011

(86) PCT No.: PCT/SG2011/000455
§ 371 (c)(1),
(2), (4) Date: Oct. 24, 2012

(87) PCT Pub. No.: WO2013/100854
PCT Pub. Date: Jul. 4, 2013

(65) Prior Publication Data
US 2013/0179291 A1   Jul. 11, 2013

(51) Int. Cl.
*G06Q 30/08* (2012.01)
*H04W 72/04* (2009.01)
*H04L 12/911* (2013.01)

(52) U.S. Cl.
CPC .............. *G06Q 30/08* (2013.01); *H04L 47/72* (2013.01)

(58) Field of Classification Search
CPC ....................................................... G06Q 30/06
(Continued)

(56) References Cited

U.S. PATENT DOCUMENTS

| 5,845,265 A | 12/1998 | Woolston |
| 6,044,363 A | 3/2000 | Mori et al. |

(Continued)

FOREIGN PATENT DOCUMENTS

WO   0182021 A2   11/2001

OTHER PUBLICATIONS

Grigonis, Richard. "Bandwidth for the Buck." Computer Telephony 9.2 (2001): 60. ProQuest. Aug. 6, 2016.*

(Continued)

*Primary Examiner* — Jeffrey A Smith
*Assistant Examiner* — Jennifer Lee
(74) *Attorney, Agent, or Firm* — Brundidge & Stanger, P.C.

(57) ABSTRACT

Technologies and implementations for facilitating and participating in bandwidth auctions are generally disclosed. Examples may include transmitting a bandwidth bid request including a bandwidth request quantity, a bandwidth request timing, a bandwidth request bid price, and a bandwidth request location to a bandwidth auction provider in response to a bandwidth need notification, receiving a bid win notification including a bandwidth bid win quantity, a bandwidth bid win timing, a bandwidth bid win location, a bandwidth bid win price, a bandwidth provider and a bandwidth activation token from the bandwidth auction provider, transmitting a bandwidth request including the bandwidth activation token to the bandwidth provider in response to the bid win notification, and receiving bandwidth from the bandwidth provider based at least in part on the bandwidth activation token.

11 Claims, 9 Drawing Sheets

| APPLICATION | RECOMMENDED BANDWIDTH |
|---|---|
| Mobile Voice Call | 6 to 12 kbs |
| Text-Based Email | 10 to 20 kbps |
| Low-Quality Music Stream | 28 kbps |
| Medium-Quality Music Stream | 128 kbps |
| High-Quality Music Steam | 300 kbps |
| Video Conferencing | 384 kbps to 3 Mbps |
| Entry-Level, High-Speed Internet | 1 Mbps |
| Responsive Web Browsing | 1 Mbps |
| Streaming Video | 1 to 2 Mbps |
| Telecommuting | 1 to 5 Mbps |
| Gaming | 1 to 10 Mbps |
| Enterprise Applications | 1 to 10 Mbps |
| Standard Definition TV | 2 Mbps |
| Distance Learning | 3 Mbps |
| Basic, High-Speed Internet | 5 Mbps |
| High Definition TV | 7.5 to 9 Mbps |
| Multimedia Web Interaction | 10 Mbps |
| Enhanced, High-Speed Internet | 10 to 100 Mbps |

(58) Field of Classification Search
USPC .............................................. 705/26.1–27.2
See application file for complete search history.

(56) References Cited

U.S. PATENT DOCUMENTS

| | | | |
|---|---|---|---|
| 6,161,099 | A | 12/2000 | Harrington et al. |
| 6,549,904 | B1 | 4/2003 | Ortega et al. |
| 7,475,036 | B2 | 1/2009 | Eyre |
| 7,702,540 | B1 | 4/2010 | Woolston |
| 2003/0002862 | A1* | 1/2003 | Rodriguez ......... H04N 7/17318 386/234 |
| 2007/0106571 | A1 | 5/2007 | Grove et al. |
| 2007/0203714 | A1* | 8/2007 | McEnroe ........... G06Q 30/0601 705/26.1 |
| 2008/0279147 | A1* | 11/2008 | Hassan ................ H04W 28/18 370/330 |
| 2009/0232074 | A1 | 9/2009 | Yang et al. |
| 2010/0085318 | A1* | 4/2010 | Lee .................... G06F 3/04883 345/173 |
| 2010/0145862 | A1* | 6/2010 | Chang .................. G06Q 30/08 705/80 |
| 2010/0235285 | A1 | 9/2010 | Hoffberg |

OTHER PUBLICATIONS

Zokem Study, Mobile web usage increases after dark, I Programmer, Jan. 3, 2011, accessed online on Aug. 20, 2012 via http://www.i-programmer.info/news/83-mobliephone/1782-mobile-web-usage-increases-after-dark.htm, USA.

Morgan Stanley Research,Theme 6: massive data growth driving carrier/equipment transition, Dec. 15, 2009, pp. 271-424, accessed online on Aug. 20, 2012 via http://www.morganstanley.com/institutional/techresearch/pdfs/Theme_6_Data_Growth.pdf, Morgan Stanley, 2009, USA.

IDA Singapore, Quality of service, Aug. 2, 2012, accessed online on Aug. 20, 2012 via http://www.ida.gov.sg/Policies%20and%20Regulation/20060424141236.aspx, Singapore.

IDA Singapore, IDA's new regulations for mobile and broadband services empower consumers to make informed choices, Press release, Mar. 14, 2011 accessed online on Aug. 20, 2012 via http://www.ida.gov.sg/News%20and%20Events/20110314122636.aspx?getPagetype=20, Singapore.

IDA Singapore, Wireless @SG programme, Jun. 14, 2010, accessed online on Jul. 13, 2011 via http://www.ida.gov.sg/Programmes/20061027174147.aspx?getPagetype=36, Singapore.

joiku.com, JoikuSpot premium—WiFi hotspot, accessed online on Jul. 13, 2011 via http://www.joiku.com/products, Joikusoft Oy.

Parkes, David C., Auction theory, Lecture at Harvard University, CS 286r-Spring 2002, pp. 1-25, accessed online on Aug. 20, 2012 via http://www.eecs.harvard.edu/~parkes/cs286r/spring02/lectures/class7.pdf.

Ausubel, Lawrence M. et al, The lovely but lonely Vickrey auction, pp. 1-37, accessed online on Aug. 20, 2012 via http://citeseer.ist.psu.edu/viewdoc/download;jsessionid=3C55340525D0167513CCD8EA925FB375?doi=10.1.1.120.7158&rep=rep1&type=pdf.

Edelman, Benjamin et al, Internet advertising and the generalized second-price auction: selling billions of dollars worth of keywords, Mar. 2007, pp. 242-259, vol. 97, No. 1, The American Economic Review, USA.

Dramitinos, M., A bandwidth allocation mechanism for 4G, European Wireless Technology Conference, 2009, Sep. 28-29, 2009, pp. 96-99, Conference Publications, Roma, Italy.

Chen, L., Market-based bandwidth allocation for target tracking in wireless sensor networks, A thesis submitted to the Graduate Faculty of Rensselaer Polytechnic Institute, May 2010, pp. 1-33, New York, USA.

Ming, L. et al, VCG auction based hierarchical bandwidth sharing scheme for integrated heterogeneous networks, WiCom'09 Proceedings of the 5th International Conference on Wireless communications, networking and mobile computing, Sep. 24-26, 2009, pp. 1-4, IEEE Press, NJ, USA.

Australian Patent Office, International search report & written opinion of the International searching authority for PCT/SG2011/000455 mailed on Feb. 21, 2012.

Maille, P. et al, An auction-based pricing scheme for bandwidth sharing with history-dependent utility functions, pp. 40-49, France.

Takahashi, E. et al, Bandwidth allocation by using generalized vickrey auction, 2001 Asia pacific symposium on information and telecommunication technologies, 2001, pp. 1-5.

* cited by examiner

800 A computer program product

802 A signal bearing medium

804 Machine-readable instructions that, when executed,
cause a device to facilitate or participate in a bandwidth auction by:

transmitting a bandwidth bid request to a bandwidth auction provider in response to a bandwidth need notification, the bandwidth bid request including a bandwidth request quantity, a bandwidth request timing, a bandwidth request bid price, and a bandwidth request location;

receiving a bid win notification from the bandwidth auction provider, the bid win notification including a bandwidth bid win quantity, a bandwidth bid win timing, a bandwidth bid win location, a bandwidth bid win price, a bandwidth provider and a bandwidth activation token;

transmitting a bandwidth request including the bandwidth activation token to the bandwidth provider in response to the bid win notification;

receiving bandwidth from the bandwidth provider based at least in part on the bandwidth activation token;

receiving a first bandwidth submission from a first bandwidth source, the first bandwidth submission having a first bandwidth submission quantity, a first bandwidth submission timing, and a first bandwidth submission location;

receiving a second bandwidth submission from a second bandwidth source, the second bandwidth submission having a second bandwidth submission quantity, a second bandwidth submission timing, and a second bandwidth submission location;

pooling and arranging the first bandwidth submission and the second bandwidth submission to provide a pool of bandwidth for auction;

receiving a plurality of bandwidth bid requests from a plurality of bandwidth requestors, each of the plurality of bandwidth bid requests having a bandwidth request quantity, a bandwidth request timing, a bandwidth request bid price, and a bandwidth request location;

performing an auction on the pool of bandwidth for auction to determine a bid win for at least a portion of bandwidth;

transmitting a bid win notification based on the bid win to a bandwidth bid winner, the bid win notification including a bandwidth bid win quantity, a bandwidth bid win timing, a bandwidth bid win location, a bandwidth bid win price, a bandwidth provider and a bandwidth activation token;

transmitting a bandwidth submission to a bandwidth auction provider, the bandwidth submission having a bandwidth submission quantity, a bandwidth submission timing, and a bandwidth submission location;

receiving a bandwidth use request related to the bandwidth submission from a bandwidth user, the bandwidth use request including a bandwidth activation token;

evaluating the bandwidth activation token to verify the bandwidth use request;

providing bandwidth to the bandwidth user; or receiving payment for the bandwidth.

| 806 a computer-readable medium | 808 a recordable medium | 810 a communications medium |

Fig. 8

METHOD, SYSTEM, AND COMPUTER-READABLE MEDIUM FOR BANDWIDTH AUCTIONS WITH BANDWIDTH BID REQUESTS BASED MOBILE DEVICE APPLICATION TABLES

CROSS-REFERENCE TO RELATED APPLICATIONS

This Application is the U.S. National Stage filing under 35 U.S.C. §371 of PCT Application Ser. No. PCT/SG2011/000455 filed on Dec. 29, 2011. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

Current mobile data service may have a limited capacity such that the quality of service delivered to users during peak usage hours may be significantly lower than that delivered during non-peak usage hours.

SUMMARY

The present disclosure describes examples methods for facilitating and participating in bandwidth auctions. Example methods may include transmitting a bandwidth bid request including a bandwidth request quantity, a bandwidth request timing, a bandwidth request bid price, and a bandwidth request location to a bandwidth auction provider in response to a bandwidth need notification, receiving a bid win notification including a bandwidth bid win quantity, a bandwidth bid win timing, a bandwidth bid win location, a bandwidth bid win price, a bandwidth provider and a bandwidth activation token from the bandwidth auction provider, transmitting a bandwidth request including the bandwidth activation token to the bandwidth provider in response to the bid win notification, and receiving bandwidth from the bandwidth provider based at least in part on the bandwidth activation token.

Example methods may also include receiving a first bandwidth submission having a first bandwidth submission quantity, a first bandwidth submission timing, and a first bandwidth submission location from a first bandwidth source, receiving a second bandwidth submission having a second bandwidth submission quantity, a second bandwidth submission timing, and a second bandwidth submission location from a second bandwidth source, pooling and arranging the first bandwidth submission and the second bandwidth submission to provide a pool of bandwidth for auction, receiving a plurality of bandwidth bid requests from a plurality of bandwidth requestors, each of the plurality of bandwidth bid requests having a bandwidth request quantity, a bandwidth request timing, a bandwidth request bid price, and a bandwidth request location, performing an auction on the pool of bandwidth for auction to determine a bid win for at least a portion of bandwidth; and transmitting a bid win notification based on the bid win to a bandwidth bid winner, the bid win notification including a bandwidth bid win quantity, a bandwidth bid win timing, a bandwidth bid win location, a bandwidth bid win price, a bandwidth provider and a bandwidth activation token.

Example methods may also include transmitting a bandwidth submission having a bandwidth submission quantity, a bandwidth submission timing, and a bandwidth submission location to a bandwidth auction provider, receiving a bandwidth use request including a bandwidth activation token related to the bandwidth submission from a bandwidth user, evaluating the bandwidth activation token to verify the bandwidth use request, providing bandwidth to the bandwidth user, and receiving payment for the bandwidth.

The present disclosure also describes example machine readable non-transitory medium having stored therein instructions that, when executed, cause a device to facilitate or participate in a bandwidth auction. Example machine readable non-transitory media may have stored therein instructions that, when executed, cause a device to participate in a bandwidth auction by transmitting a bandwidth bid request including a bandwidth request quantity, a bandwidth request timing, a bandwidth request bid price, and a bandwidth request location to a bandwidth auction provider in response to a bandwidth need notification, receiving a bid win notification including a bandwidth bid win quantity, a bandwidth bid win timing, a bandwidth bid win location, a bandwidth bid win price, a bandwidth provider and a bandwidth activation token from the bandwidth auction provider, transmitting a bandwidth request including the bandwidth activation token to the bandwidth provider in response to the bid win notification, and receiving bandwidth from the bandwidth provider based at least in part on the bandwidth activation token.

Other example machine readable non-transitory media may have stored therein instructions that, when executed, cause a device to facilitate a bandwidth auction by receiving a first bandwidth submission having a first bandwidth submission quantity, a first bandwidth submission timing, and a first bandwidth submission location from a first bandwidth source, receiving a second bandwidth submission having a second bandwidth submission quantity, a second bandwidth submission timing, and a second bandwidth submission location from a second bandwidth source, pooling and arranging the first bandwidth submission and the second bandwidth submission to provide a pool of bandwidth for auction, receiving a plurality of bandwidth bid requests from a plurality of bandwidth requestors, each of the plurality of bandwidth bid requests having a bandwidth request quantity, a bandwidth request timing, a bandwidth request bid price, and a bandwidth request location, performing an auction on the pool of bandwidth for auction to determine a bid win for at least a portion of bandwidth; and transmitting a bid win notification based on the bid win to a bandwidth bid winner, the bid win notification including a bandwidth bid win quantity, a bandwidth bid win timing, a bandwidth bid win location, a bandwidth bid win price, a bandwidth provider and a bandwidth activation token.

Other example machine readable non-transitory media may have stored therein instructions that, when executed, cause a device to participate in a bandwidth auction by include transmitting a bandwidth submission having a bandwidth submission quantity, a bandwidth submission timing, and a bandwidth submission location to a bandwidth auction provider, receiving a bandwidth use request including a bandwidth activation token related to the bandwidth submission from a bandwidth user, evaluating the bandwidth activation token to verify the bandwidth use request, providing bandwidth to the bandwidth user, and receiving payment for the bandwidth.

The present disclosure also describes example devices. Example devices may include a processor and a machine readable medium having stored therein instructions that, when executed, cause the device to participate in a bandwidth auction by transmitting a bandwidth bid request including a bandwidth request quantity, a bandwidth request timing, a bandwidth request bid price, and a bandwidth request location to a bandwidth auction provider in response to a bandwidth need notification, receiving a bid win notification including a bandwidth bid win quantity, a bandwidth bid win timing, a bandwidth bid win location, a bandwidth bid win price, a bandwidth provider and a bandwidth activation token from the bandwidth auction provider, transmitting a bandwidth request including the bandwidth activation token to the bandwidth provider in response to the bid win notification, and receiving bandwidth from the bandwidth provider based at least in part on the bandwidth activation token.

Other example devices may include a processor and a machine readable medium having stored therein instructions that, when executed, cause the device to facilitate a bandwidth auction by receiving a first bandwidth submission having a first bandwidth submission quantity, a first bandwidth submission timing, and a first bandwidth submission location from a first bandwidth source, receiving a second bandwidth submission having a second bandwidth submission quantity, a second bandwidth submission timing, and a second bandwidth submission location from a second bandwidth source, pooling and arranging the first bandwidth submission and the second bandwidth submission to provide a pool of bandwidth for auction, receiving a plurality of bandwidth bid requests from a plurality of bandwidth requestors, each of the plurality of bandwidth bid requests having a bandwidth request quantity, a bandwidth request timing, a bandwidth request bid price, and a bandwidth request location, performing an auction on the pool of bandwidth for auction to determine a bid win for at least a portion of bandwidth; and transmitting a bid win notification based on the bid win to a bandwidth bid winner, the bid win notification including a bandwidth bid win quantity, a bandwidth bid win timing, a bandwidth bid win location, a bandwidth bid win price, a bandwidth provider and a bandwidth activation token.

Other example devices may include a processor and a machine readable medium having stored therein instructions that, when executed, cause the device to participate in a bandwidth auction by transmitting a bandwidth submission having a bandwidth submission quantity, a bandwidth submission timing, and a bandwidth submission location to a bandwidth auction provider, receiving a bandwidth use request including a bandwidth activation token related to the bandwidth submission from a bandwidth user, evaluating the bandwidth activation token to verify the bandwidth use request, providing bandwidth to the bandwidth user, and receiving payment for the bandwidth.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 8 is an illustration of an example computer program product; and

DETAILED DESCRIPTION

Figure 1:
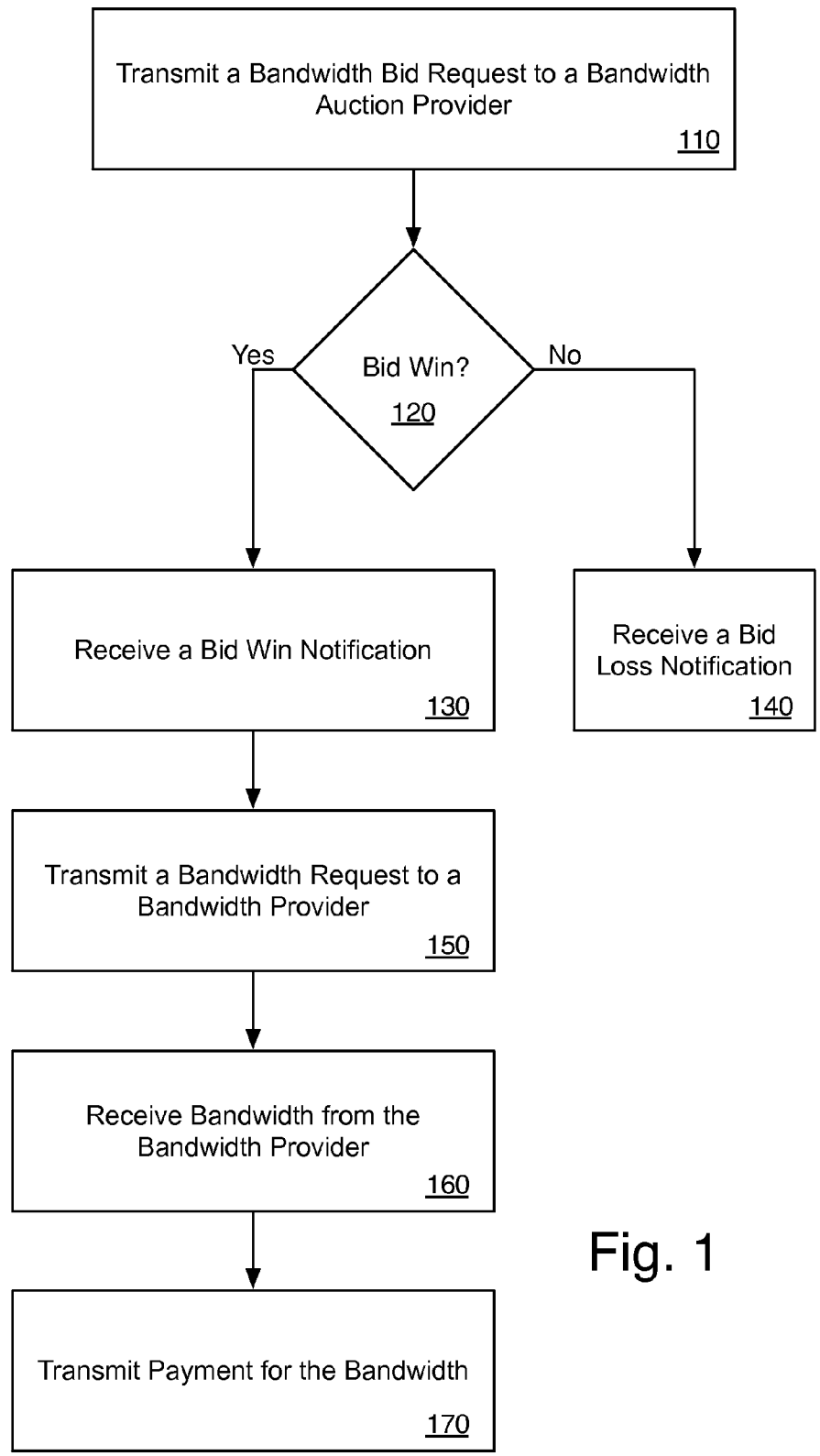
FIG. 1 is an illustration of a block diagram of an example method for participating in a bandwidth auction.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing, facilitating, or participating in bandwidth auctions.

In some examples, methods discussed herein may be performed by bandwidth purchasers, bandwidth auction facilitators, or bandwidth providers. In some examples, a bandwidth bid request may be transmitted from a bandwidth purchaser to a bandwidth auction facilitator. Bandwidth submissions may be transmitted from a bandwidth provider to the bandwidth auction facilitator. The bandwidth auction facilitator may pool and arrange received bandwidth submissions in preparation for an auction. The bandwidth auction facilitator may further perform one or more auctions based on the pooled and arranged bandwidth submissions and the received bandwidth bid requests. In some examples, the auction may include a Vickrey-Clarke-Gloves (VCG) auction. The bandwidth auction results may be transmitted to bandwidth purchasers and bandwidth providers. The bandwidth purchaser and bandwidth provider may communicate such that the bandwidth may be provided to the purchaser by the provider. Such communications may be initiated by either party to the bandwidth transaction. The bandwidth purchaser may pay the bandwidth provider using either actual currency or virtual currency. The payment may be made directly or the payment may be made through an intermediary. In some examples, the intermediary may be the bandwidth auction facilitator. Further, payment for the auction service may be made from either the bandwidth purchaser or the bandwidth provider to the bandwidth auction facilitator.

The methods, devices, systems and computer readable media discussed herein provide a platform and methods for the buying and selling bandwidth among telecommunications companies, between telecommunications companies and corporate network (e.g., Wi-Fi) providers, or mobile users, or the like. In some examples, the techniques discussed may provide efficient, dynamic, real-time, and location-based bandwidth allocation as needed.

FIG. 1 is an illustration of a block diagram of an example method 100 for participating in a bandwidth auction, arranged in accordance with at least some embodiments of the present disclosure. In general, method 100 may be performed by any suitable device, devices, or system such as those discussed herein. In general, method 100 may be performed by a bandwidth requestor and/or user device. In some examples, method 100 may be performed by a mobile device. In some examples, method 100 may be performed by a bandwidth provider such that the provider may purchase additional bandwidth to provide additional bandwidth to its users.

Method 100 sets forth various functional blocks or actions that may be described as processing steps, functional operations, events and/or acts, etc., which may be performed by hardware, software, and/or firmware. Numerous alternatives to the functional blocks shown in FIG. 1 may be practiced in various implementations. For example, intervening actions not shown in FIG. 1 and/or additional actions not shown in FIG. 1 may be employed and/or some of the actions shown in FIG. 1 may be eliminated, without departing from the scope of claimed subject matter. Method 100 may include one or more of functional operations as indicated by one or more of blocks 110, 120, 130, 140, 150, 160 and/or 170. The process of method 100 may begin at block 110.

At block 110, "Transmit a Bandwidth Bid Request to a Bandwidth Auction Provider", a bandwidth bid request may be transmitted from a bandwidth requester to a bandwidth auction provider. In some examples, the bandwidth request may be generated in response to a bandwidth need notification. In general, a bandwidth need notification may indicate to the bandwidth requester that bandwidth may be needed at a bandwidth requester device. In some examples, the bandwidth need notification may be provided by a device user. In some examples, the bandwidth need notification may be device generated in response to a prepaid quota being exhausted. In some examples, the bandwidth need notification may be device generated in response to a postpaid quota reaching a predetermined threshold.

In some examples, method 100 may be performed by a bandwidth provider and the bandwidth need notification may be generated in response to the bandwidth provider using a predetermined percentage of a capacity of the bandwidth provider. For example, at a telecommunications company, if a tower cell or location may reach a preset threshold percentage of capacity (e.g., 90% of capacity), the telecommunications system may automatically generate one or more bandwidth requests for a bandwidth auction. Such bandwidth requests may be location-based including a location of the tower cell or location that may have reached the preset threshold.

In general, the transmitted bandwidth bid request may include any information that may provide the bandwidth auction provider the information necessary for the device to participate in the bandwidth auction. In some examples, the bandwidth bid request may include a bandwidth request quantity, a bandwidth request timing, a bandwidth request bid price, or a bandwidth request location, or the like. In some examples, the bandwidth bid request location may be automatically generated by the requesting device based in part on a global positioning system (GPS) determined location of the device. In some examples, the bandwidth request location may include a boundary that may define an area in which the bandwidth may be used.

As discussed, in some examples, the bandwidth requester may generate and transmit a bandwidth bid request to an auction provider. In some examples, the bandwidth requester may generate and transmit the bandwidth bid request at least partially in response to receiving an indication of an available bandwidth auction from a bandwidth auction provider or other source. In some examples, the bandwidth requester device may be enabled to receive notifications of bandwidth auctions. In some examples, the device may be a subscriber to a service or system that provides notifications of bandwidth auctions. In various examples, the notification of a bandwidth auction may be received from an auction provider, a subscription service provider, an auction scheduler, a compiling service, or the like.

At block 120, "Bid Win?", it may be determined whether the bandwidth requester won the bid based on the bandwidth bid request. As will be appreciated, the determination of whether the device won the bid may be made by an auction provider, as is further discussed herein. If the bandwidth requester did not win the bid, the process of method 100 may continue at block 140. If the bandwidth requester did win the bid (or a portion of a bid), the process of method 100 may continue at block 130.

At block 140, "Receive a Bid Loss Notification", the bandwidth requester may receive a bid loss notification from the auction provider. The bid loss notification may be transmitted from the auction provider to the bandwidth requester in any suitable manner. In some examples, the bid loss notification may include information indicating the device lost the bid. In some examples, the bid loss notification may include additional information such as the winning price or other information that may allow the device or the device user to modify future bandwidth auction bids.

At block 130, "Receive a Bid Win Notification", the bandwidth requester may receive a bid win notification from the auction provider. The bid win notification may be transmitted from the auction provider to the device in any suitable manner. In some examples, the bid win notification may include information indicating the device won the bid. In some examples, the bid win notification may include information indicating the device won a portion of the bid. In some examples, the bid win notification may include bandwidth bid win quantity, a bandwidth bid win timing, a bandwidth bid win location, a bandwidth bid win price, a bandwidth provider and a bandwidth activation token. In some examples, the bid win notification may include a bid win time slot, a bid win bandwidth provider or bandwidth source identification, or a price per bandwidth, or the like. In some examples, the bandwidth requester may have prepaid for bandwidth and in such examples, the bandwidth win notification may include an amount of funds remaining for use. The process of method 100 may continue at block 150.

At block 150, "Transmit a Bandwidth Request to a Bandwidth Provider", the bandwidth requester may transmit a bandwidth request to a bandwidth provider. In general, the bandwidth requester may transmit the bandwidth request to a bandwidth provider indicated in the received bid win notification. In some examples, the bandwidth request may include a bandwidth activation token received in the received bid win notification. The process of method 100 may continue at block 160.

At block 160, "Receive Bandwidth from the Bandwidth Provider", the bandwidth requester may receive bandwidth from the bandwidth provider. In general, the bandwidth received at the device may be any suitable bandwidth. In some examples, the bandwidth may be Wi-Fi bandwidth. The process of method 100 may continue at block 170.

At block 170, "Transmit Payment for the Bandwidth", the bandwidth requester may transmit a payment for the bandwidth. In some examples, the device may transmit payment to the bandwidth provider. In some examples, the device may transmit payment to the bandwidth auction provider. In some examples, the device may transmit payment to a third party such as, for example, a financial intermediary, clearinghouse, bank, or the like. In some examples, the payment may include a currency payment in a currency local to the bandwidth provision and transaction such as, for example, U.S. Dollars, or the like. In some examples, the payment may include a virtual currency payment such that the virtual currency may be valued relative to a government provided and/or backed currency. For example, a bandwidth purchaser may first purchase virtual currency (e.g., points, vouchers, tokens, or the like) and then use the purchased virtual currency to purchase bandwidth. Such examples may offer advantages such as preselling to the purchaser, verification of ability to pay and/or credit rating prior to starting the auction, or the like.

The process of method 100 may be repeated any number of times by a bandwidth requester. As discussed herein, numerous auctions may be provided over time such that a bandwidth requester may participate in auctions routinely or ad hoc as their bandwidth needs dictate. As will be appreciated, the process of method 100 may be performed by any number of bandwidth requesters either simultaneously or over time.

Figure 2:
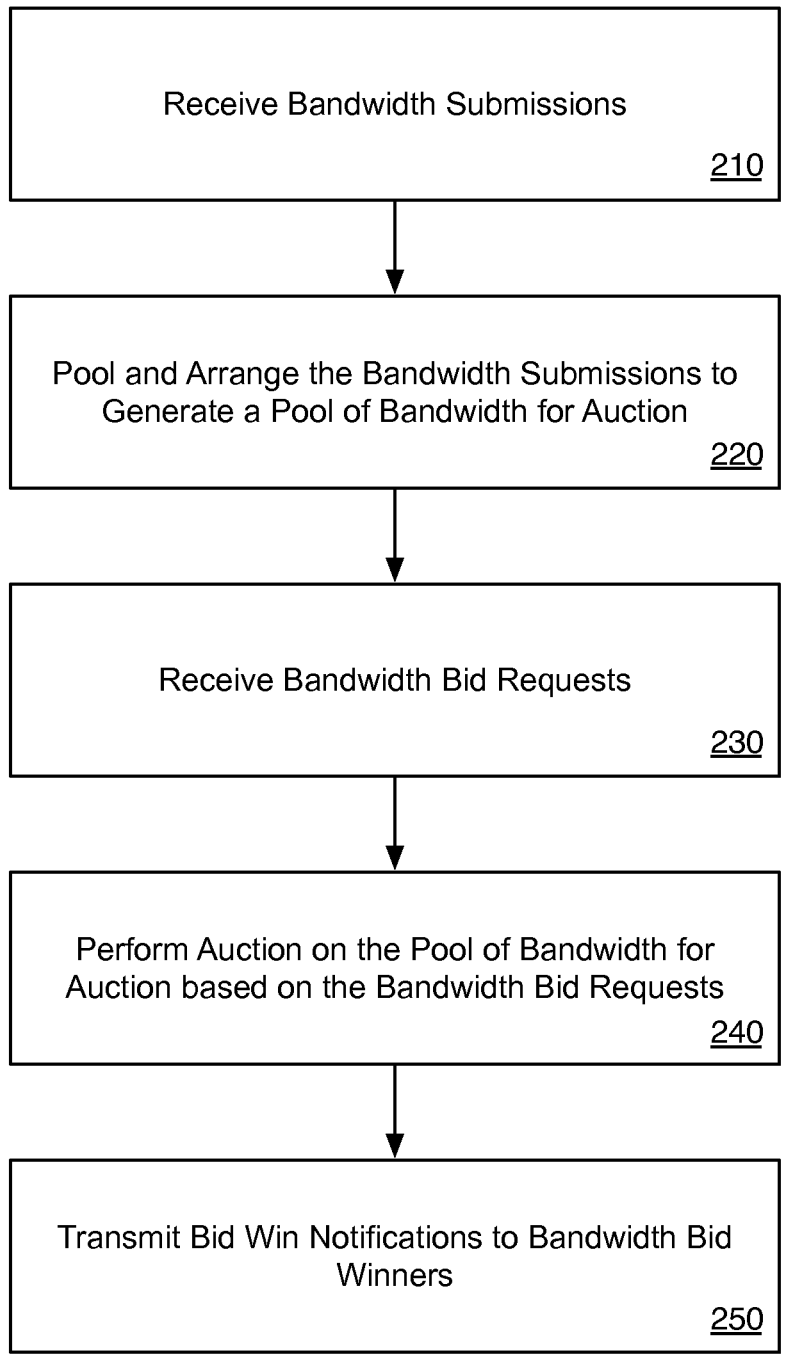
FIG. 2 is an illustration of a block diagram of an example method for facilitating a bandwidth auction.

FIG. 2 is an illustration of a block diagram of an example method 200 for facilitating a bandwidth auction, arranged in accordance with at least some embodiments of the present disclosure. In general, the method of FIG. 2 may be performed by any suitable device, devices, or system such as those discussed herein. In some examples, method 200 may be performed by a server system, computing device, or computing devices operated by a bandwidth auction provider. Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210, 220, 230, 240, and/or 250. The process of method 200 may begin at block 210.

At block 210, "Receive Bandwidth Submissions", a bandwidth auction facilitator may receive bandwidth submissions from one or more bandwidth providers. In general, the bandwidth submissions may include any information suitable to describe the future available bandwidth that the bandwidth provider may be offering for auction. In some examples, the bandwidth submissions may include a bandwidth submission quantity, a bandwidth submission timing, or a bandwidth submission location, or the like. In some examples, the bandwidth bid submission location may include a boundary defining a bandwidth usability area.

In some examples, the bandwidth submissions may be received in response to a bandwidth submissions request generated and provided by the bandwidth auction facilitator. The bandwidth auction facilitator may provide a bandwidth submissions request based on a high demand for bandwidth, on a regular schedule, at times of known or expected high bandwidth use, or the like. In some examples, the bandwidth submissions request may be provided to known and/or registered bandwidth providers. In some examples, the bandwidth providers may include telecommunications companies, corporate Wi-Fi networks, or telecommunications users that maintain substantially stable and available networks, such as Wi-Fi networks.

In some examples, the bandwidth auction facilitator may generate and transmit a bandwidth submission receipt confirmation to the bandwidth providers such that the bandwidth providers may verify a submission has been received. In general, the bandwidth submission receipt confirmation may include any suitable information that confirms receipt. In some examples, the bandwidth submission receipt confirmation may include a time stamp, details related to the submitted bandwidth, or a token that confirms receipt, or the like.

In some examples, the bandwidth auction facilitator may receive bandwidth submissions from at least a first bandwidth source and a second bandwidth source such that a first bandwidth submission may be received from the first bandwidth source and a second bandwidth submission may be received from the second bandwidth source. In some examples, the first bandwidth submission may include a first bandwidth submission quantity, a first bandwidth submission timing, and a first bandwidth submission location. In some examples, the second bandwidth submission may include second bandwidth submission quantity, a second bandwidth submission timing, and a second bandwidth submission location.

In general, any number of bandwidth submissions from any number of bandwidth providers may be received. In some examples, the bandwidth auction provider may limit the number of bandwidth submissions and reject any additional submissions on either a first come first serve basis or based on the identity and/or status of the bandwidth providers. In some examples, two to five bandwidth submissions may be received and/or accepted. In some examples, five to 20 bandwidth submissions may be received and/or accepted. In some examples, 20 to 50 or more bandwidth submissions may be received and/or accepted. In some examples, the bandwidth providers may include priority providers such that they may have paid a fee to be prioritized to be included an auction or such that repeat or quality providers may be prioritized to be included in an auction. The process of method 200 may continue at block 220.

At block 220, "Pool and Arrange the Bandwidth Submissions to Generate a Pool of Bandwidth for Auction", the received bandwidth submissions may be pooled and/or arranged for auction. In general, any method or methods may be used to pool and/or arrange the available bandwidth as is discussed further herein, in particular with respect to FIG. 6 below. In general, the pooling and/or arranging of the bandwidth may arrange the bandwidth into useable segments such that, for example, a certain bandwidth (e.g., 2 Mbps) may be purchased over a certain duration (e.g., 15 minutes). As will be appreciated, the bandwidth may be arranged in any suitable manner based on bandwidth amounts received, saleable durations, or the like. The process of method 200 may continue at block 230.

At block 230, "Receive Bandwidth Bid Requests", the bandwidth auction facilitator may receive bandwidth bid requests from one or more bandwidth users. In general, the bandwidth bid requests may include any information suitable to bid on available bandwidth. In some examples, each received bandwidth bid requests may include a bandwidth request quantity, a bandwidth request timing, a bandwidth request bid price, or a bandwidth request location, or the like. In some examples, the bandwidth auction facilitator may generate and transmit a bid receipt confirmation to the bandwidth requestors such that the bandwidth requestors may verify a submission has been received. In general, the bid receipt confirmation may include any suitable information that confirms receipt. In some examples, the bid receipt confirmation may include a time stamp, details related to the submitted bid, or a token that confirms receipt, or the like.

In some examples, the received bandwidth bid requests may be received based on a bandwidth schedule or information previously provided to potential bidders. In some examples, such information may be provided publicly or privately to interested and/or registered bidding parties. In some examples, such information may be provided for each auction or it may be provided such that auctions follow a common format. The process of method 200 may continue at block 240.

At block 240, "Perform Auction on the Pool of Bandwidth for Auction based on the Bandwidth Bid Requests", the bandwidth auction facilitator may perform an auction on the pool of bandwidth based on the bandwidth bid requests. In general, the performed auction may be any suitable type of auction. In some examples, the auction may be a Vickrey-Clarke-Gloves (VCG) auction. In general, in a VCG auction, bandwidth requester submissions may include bid prices and bandwidth amounts as sealed bids. In some examples, the selection of winning bids may include selecting a winning bid or bids the greedy method such that bids may be sorted in decreasing order based on per-bandwidth bid price and bandwidth bids may be greedily accept, such that bids may be accepted with highest per-bandwidth bid prices accepted first and being accepted as available in an order of decreasing per-bandwidth bid price. In some examples, winning price computation may be done by computing the price based on a per-bandwidth price of a first-rejected bid or by computing the price using a VCG rule such as, for example, if a bid winner, n, wins K bandwidth units, then the bid winner, n, may pay the sum of the K high rejected bids by other bidders. In general, computing the price based on the discussed VCG rule may offer the advantages of being strategy proof and/or being easier to determine at the auction facilitator. The process of method 200 may continue at block 250.

At block 250, "Transmit Bid Win Notifications to Bandwidth Bid Winners", the bandwidth auction facilitator may transmit one or more bid win notifications to auction bid winners. In general, a bid win notification may include any suitable information that allows the bid winning bandwidth user to retrieve the bandwidth related to the bid win. In some examples, a bid win notification may include a bandwidth bid win quantity, a bandwidth bid win timing, a bandwidth bid win location, a bandwidth bid win price, a bandwidth provider or a bandwidth activation token, or the like.

As discussed herein, in some examples, payment for the provided bandwidth, either in currency or virtual currency may be made directly from a bandwidth user to a bandwidth provider. In other examples, the payment may be made through the auction facilitator. In such examples, the auction facilitator may receive a user payment from the bandwidth winner and transmit a provider payment to the bandwidth provider. In some examples, the payment may be in government provided and/or backed currency. In some examples, the payment may be in virtual currency as discussed herein. In general, the auction facilitator may take payment for providing the auction in any suitable manner. In some examples, the auction facilitator may take payment from the bandwidth requester/user. In some examples, the auction facilitator may take payment from the bandwidth provider. In some examples, the payment may be based on percentage of winning bid price. In some examples, the payment may be based on a per transaction charge.

The process of method 200 may be repeated any number of times by a bandwidth auction facilitator. As discussed herein, numerous auctions may be provided over time such that bandwidth requesters may participate in auctions routinely or ad hoc as their bandwidth needs dictate.

Figure 3:
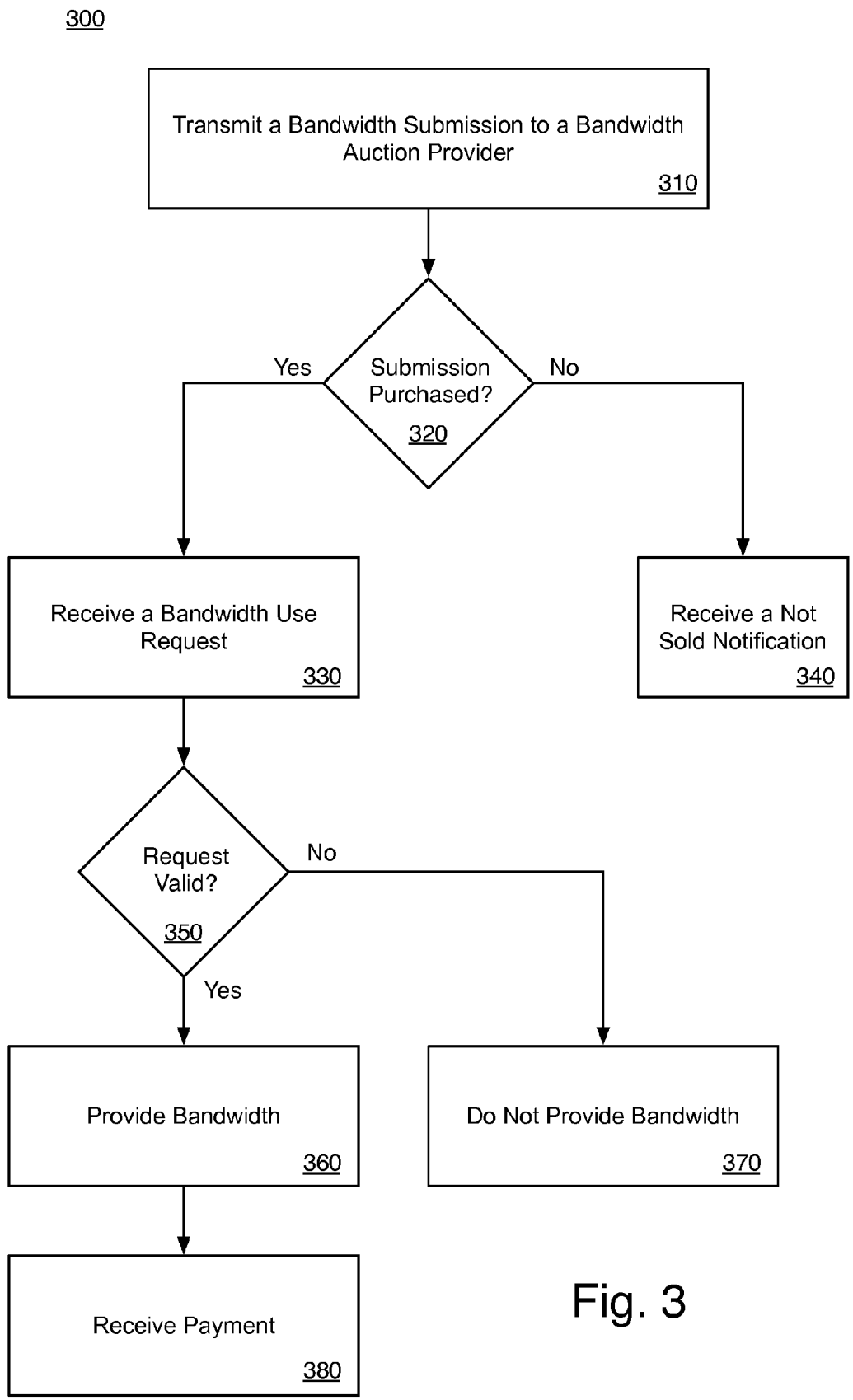
FIG. 3 is an illustration of a block diagram of an example method 300 for participating in a bandwidth auction.

FIG. 3 is an illustration of a block diagram of an example method 300 for participating in a bandwidth auction, arranged in accordance with at least some embodiments of the present disclosure. In general, the method of FIG. 3 may be performed by any suitable device, devices, or system such as those discussed herein. In some examples, method 300 may be performed by a server system, computing device, or computing devices operated by a bandwidth provider that may provide bandwidth to a bandwidth user via an auction. Method 300 sets forth various functional blocks or actions that may be described as processing steps, functional operations, events and/or acts, etc., which may be performed by hardware, software, and/or firmware. Numerous alternatives to the functional blocks shown in FIG. 3 may be practiced in various implementations. For example, intervening actions not shown in FIG. 3 and/or additional actions not shown in FIG. 3 may be employed and/or some of the actions shown in FIG. 3 may be eliminated, without departing from the scope of claimed subject matter. Method 300 may include one or more of functional operations as indicated by one or more of blocks 310, 320, 330, 340, 350, 360, 370 and/or 380. The process of method 300 may begin at block 310.

At block 310, "Transmit a Bandwidth Submission to a Bandwidth Auction Provider", a bandwidth provider may transmit one or more bandwidth submissions to a bandwidth auction provider. In general, the bandwidth submissions may include any information suitable to describe the available bandwidth that the bandwidth provider may be offering for auction. In some examples, the bandwidth submissions may include a bandwidth submission quantity, a bandwidth submission timing, or a bandwidth submission location, or the like. In some examples, the bandwidth bid submission location may include a boundary defining a bandwidth usability area. The process of method 300 may continue at block 320.

At block 320, "Submission Purchased?", it may be determined whether a bandwidth submission submitted by a bandwidth provider was purchased in an auction. As will be appreciated, the determination of whether the bandwidth submission was purchased in an auction may be made by an auction provider. If the bandwidth submission was not purchased, the process of method 300 may continue at block 340. If the bandwidth submission was purchased, the process of method 300 may continue at block 330.

At block 340, "Receive a Not Sold Notification", the bandwidth provider may receive a submission not sold notification from the auction provider. The submission not sold notification may be transmitted from the auction provider to the device in any suitable manner. In some examples, the submission not sold notification may include information indicating the submitted bandwidth was not sold at auction. In some examples, the submission not sold notification may include additional information such as an indication of bandwidth user demand or other information that may allow the bandwidth provider to modify future bandwidth submissions.

At block 330, "Receive a Bandwidth Use Request", the bandwidth provider may receive a bandwidth use request from a bandwidth user. In general, the bandwidth use request may be transmitted by a user that won the auction for all or part of the bandwidth offered by the bandwidth provider. In some examples, the bandwidth request may include a bandwidth activation token that may verify the request for bandwidth may be valid. In some examples, the bandwidth request may include a bandwidth quantity, a bandwidth timing, or a bandwidth location, or the like. As discussed with respect to block 340, a bandwidth provider may receive a bandwidth submission not sold notification from the auction provider. In some examples, a bandwidth provider may receive a bandwidth submission sold notification from the auction provider. In some examples, the notification may include secure or encrypted information that may be used to verify the bandwidth request may be valid. The process of method 300 may continue at block 350.

At block 350, "Request Valid?", it may be determined whether the bandwidth request may be a valid request. In general, the validity of the bandwidth request may be made in any suitable manner. In some examples, the validity of the bandwidth request may be made based on a received token such as, for example, a received access token. In some examples, the token may include information that may identify the requester as a valid requester. For an invalid bandwidth request, the process of method 300 may continue at block 370. For a valid bandwidth request, the process of method 300 may continue at block 360.

At block 370, "Do Not Provide Bandwidth", bandwidth may not be provided to the bandwidth requester. In some examples, the bandwidth may not be provided based on the request for validity being invalid. In some examples, the bandwidth may not be provided based on an invalid token being provided. In some examples, method 300 may end at block 370. In some examples, the bandwidth provider may reply to the bandwidth requester with a failure message. In some examples, the bandwidth provider may reply to the bandwidth requester with a failure message and the bandwidth requester may reply with updated information such that the bandwidth provider may again determine whether the bandwidth request may be valid. In some examples, the invalid request may be rectified such that the bandwidth may be provided (e.g., at block 360). In some examples, the invalid request may remain and the bandwidth may not be provided.

At block 360, "Provide Bandwidth", the bandwidth provider may provide bandwidth to the bandwidth requester. In general, the bandwidth provided may be any suitable type of bandwidth. In some examples, the provided bandwidth may be Wi-Fi bandwidth. In general, the bandwidth provided may match the bandwidth submitted by the bandwidth provider that was purchased by the bandwidth requestor at auction. The bandwidth may be provided for the auction determined duration. The bandwidth may no longer be provided with the duration has expired. The process of method 300 may continue at block 380.

At block 380, "Receive Payment", the bandwidth provider may receive payment for the provided bandwidth. In some examples, the bandwidth provider may receive payment from the bandwidth user. In some examples, the bandwidth provider may receive payment from the bandwidth auction provider, which may act as an intermediary as discussed herein. In some examples, the bandwidth provider may receive payment from a third party such as, for example, a financial intermediary, clearinghouse, bank, or the like. In some examples, the payment may include a currency payment in a currency local to the bandwidth provision and transaction such as, for example, U.S. Dollars, or the like. In some examples, the payment may include a virtual currency payment such that the virtual currency may be valued relative to a government provided and/or backed currency, as discussed herein.

In general, methods 100, 200, and 300 may be followed by a bandwidth purchaser, a bandwidth auction facilitator, and a bandwidth provider. In some examples a bandwidth bid request may be transmitted from a bandwidth purchaser to a bandwidth auction facilitator and bandwidth submissions may be transmitted form a bandwidth provider to the bandwidth auction facilitator. The bandwidth auction facilitator may pool and arrange received bandwidth submissions in preparation for an auction. The bandwidth auction facilitator may further perform one or more auctions based on the pooled and arranged bandwidth submissions and the received bandwidth bid requests. In some examples, the auction may include a Vickrey-Clarke-Gloves (VCG) auction.

The bandwidth auction results may be transmitted to bandwidth purchasers and bandwidth providers. The bandwidth purchaser and bandwidth provider may communicate such that the bandwidth may be provided to the purchaser by the provider. Such communications may be initiated by either party to the bandwidth transaction. The bandwidth purchaser may pay the bandwidth provider using either actual currency or virtual currency. The payment may be made directly or the payment may be made through an intermediary. In some examples, the intermediary may be the bandwidth auction facilitator. Further, payment for the auction service may be made from either the bandwidth purchaser or the bandwidth provider. As will be appreciated, such auctions may be provided using a variety of techniques.

As discussed herein, and in particular with respect to FIG. 1, a bandwidth requester may participate in a bandwidth auction. Also, as discussed herein, the bandwidth requester device may generate and transmit a bandwidth bid request.

Figure 4:
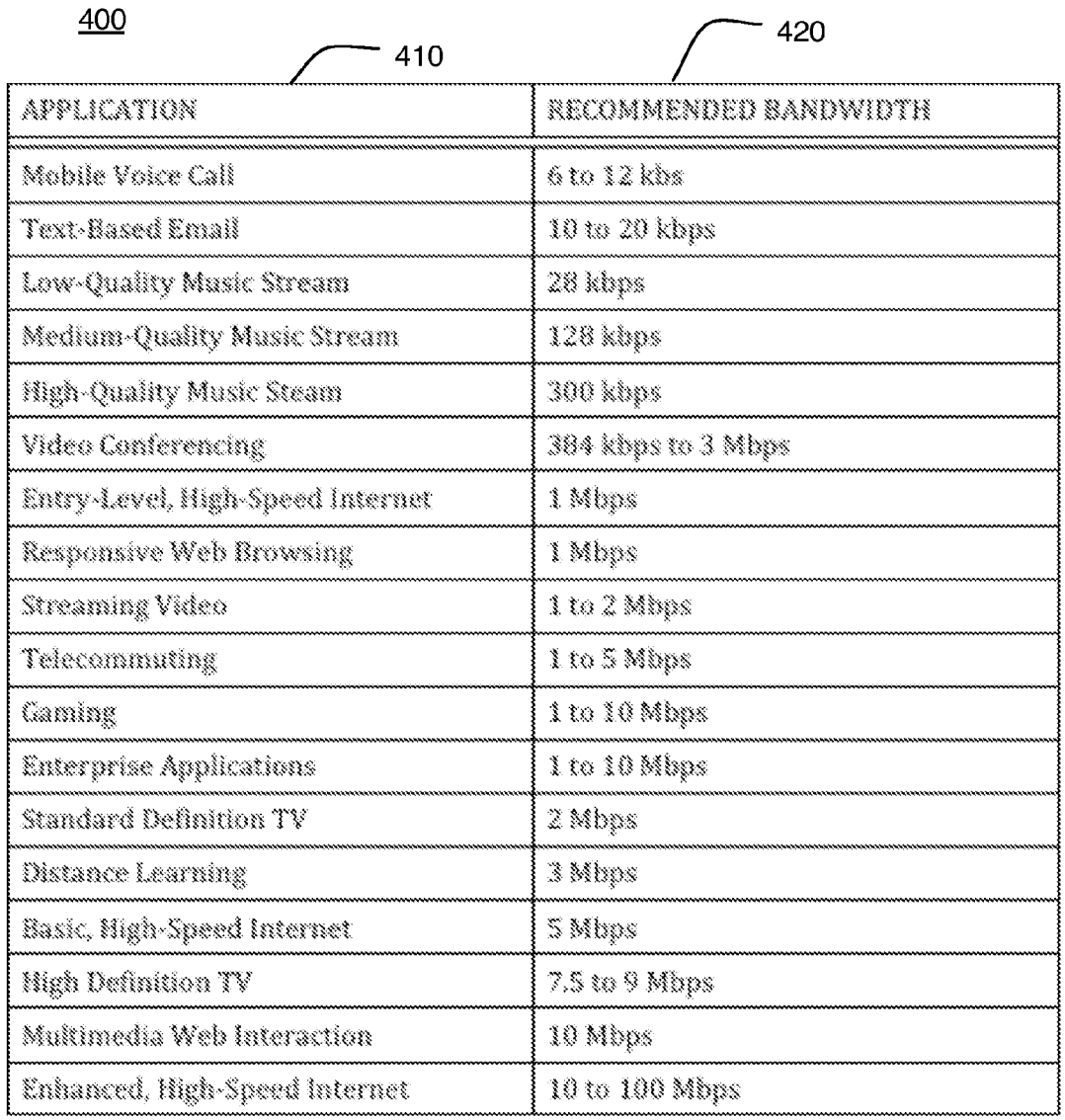
FIG. 4 is an illustration of a table that may be presented to a user via a display for selection of a bandwidth amount.

In some examples, the bandwidth bid request may be generated by a user, either partially or entirely. FIG. 4 is an illustration of a table 400 that may be presented to a user via a display for selection of a bandwidth amount, arranged in accordance with at least some embodiments of the present disclosure. Table 400 may include an application column 410 and a recommended bandwidth column 420 that may be displayed to a user. In general, a bandwidth bid request as discussed herein may be generated by receiving an input from a user in response to table 400 being presented to the user. In some examples, table 400 may be provided to a user as a pop-up message upon preparing a bandwidth bid request either in response to a user request or a device generated notification as discussed herein.

As discussed, in response to being presented with table 400, a user may provide input to the device indicating their bandwidth requirements. In general the user may provide the input in any suitable manner. In some examples, the user may select an application from application column 410 or a recommended bandwidth from recommended bandwidth column 420 by selecting it via a touch screen interface. In some examples, the selection may be made by scrolling and highlighting an application or recommended bandwidth and selecting "enter" or the like on the device. In some examples, the selection may be made by viewing table 400 such that the user may be informed of a suitable recommended bandwidth and entering a bandwidth amount as a text entry. As will be appreciated, the information provided in table 400 may be provided in any suitable manner. Further, the information provided may be customized by the user or by the device over time such that items that may not be selected may eventually be dropped from the table. In some examples, table 400 may include recommended bid prices, which may be selectable as discussed. In some examples, such recommended bid prices may be user customized or automatically modified by the device over time. In some examples, recommended bid price modifications may be based on past auction success.

In some examples, after a user has made a bandwidth selection based on being presented table 400, the user may be presented the option to enter or select a duration for the selected bandwidth. For example, upon selecting "Gaming" the user may be provided an opportunity to enter a duration (or a start and stop time) for the "Gaming" application. Upon the selection of a duration (or start and stop time), such information may be included in a bandwidth bid request as discussed herein. In some examples, upon selection of the duration (or start and stop time), the user may be again presented table 400 for a second or subsequent usage. Continuing the example for the sake of discussion, upon selecting "Gaming" application, the user may be presented table 400 and thereupon may select "Text-Based Email". The user may then select a duration for "Text-Based Email" and so on until the user has completed a bid profile for their current usage session. The per-bandwidth bid price for each time segment (or application segment) may be the same or it may be different. Such techniques may provide a relatively simple and intuitive technique for a user to participate in a bandwidth auction as discussed herein.

Figure 5:
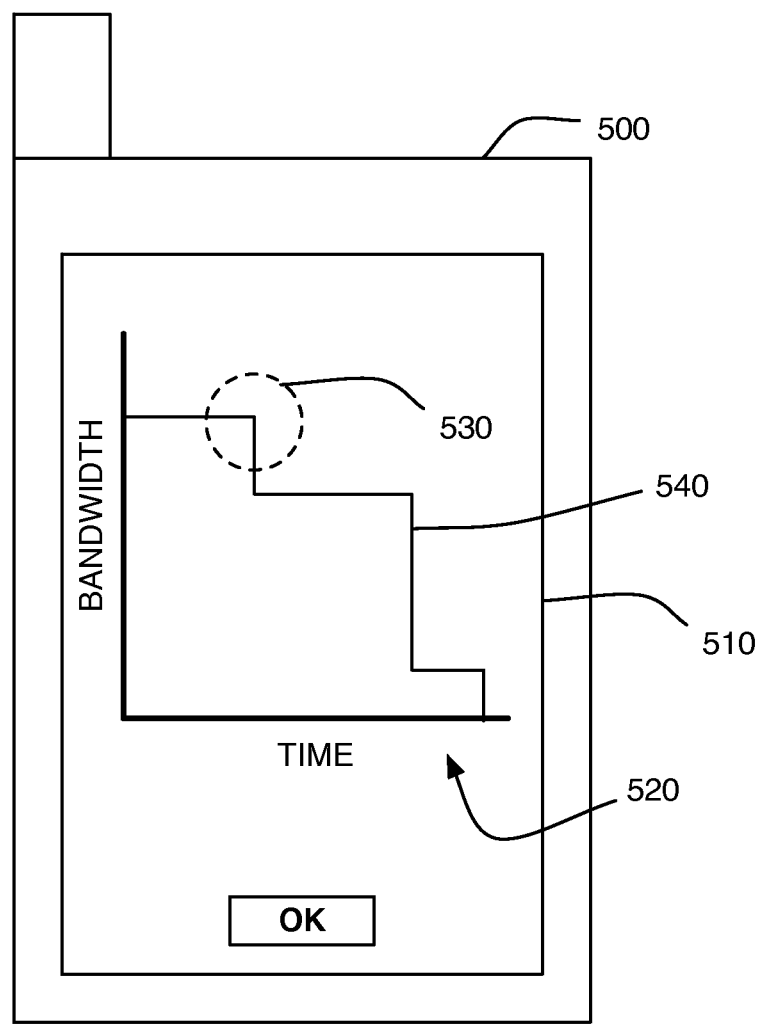
FIG. 5 is an illustration of a device that may accept user input via a touch screen.

As discussed herein, and in particular with respect to FIG. 1, a device may participate in a bandwidth auction. In some examples, the device may be a device having a touch screen interface such as a mobile device having a touch screen interface. Also, as discussed herein, the device may generate and transmit a bandwidth bid request. In some examples, the bandwidth bid request may be generated by a user, either in partially or entirely. FIG. 5 is an illustration of a device 500 that may accept user input via a touch screen, arranged in accordance with at least some embodiments of the present disclosure. Device 500 may include a touch screen 510 that may display a graphic 520 including an indicator 540 that may be manipulated by a touch point 530. In general, graphic 520 may include any suitable graphic that may be manipulated to generate bandwidth bid information.

In general, a bandwidth bid request as discussed herein may be generated by receiving an input at touch point 530 from touch screen 510 of device 500. In some examples, the input may include indication that touch screen 510 has been touched and dragged to define the bandwidth request quantity and the bandwidth request timing along a bandwidth request display chart provided to a user. As shown, in some examples, graphic 520 may include a graph showing time along one axis and bandwidth along another axis. In such examples, a user may manipulate indicator 540 to indicate desired bandwidth at various times. In the illustrated example, manipulation of indicator 540 generates a step like indicator. In general, any indicator may be used that indicates bandwidth over time such as, for example, point indicator, bar graph indicators, numerical indicators, combinations thereof or the like. As discussed, graphic 520 may be manipulated by a user at touch point 530. The user may generate and manipulate touch point 530 using any suitable object such as a stylus or a finger.

Figure 6:
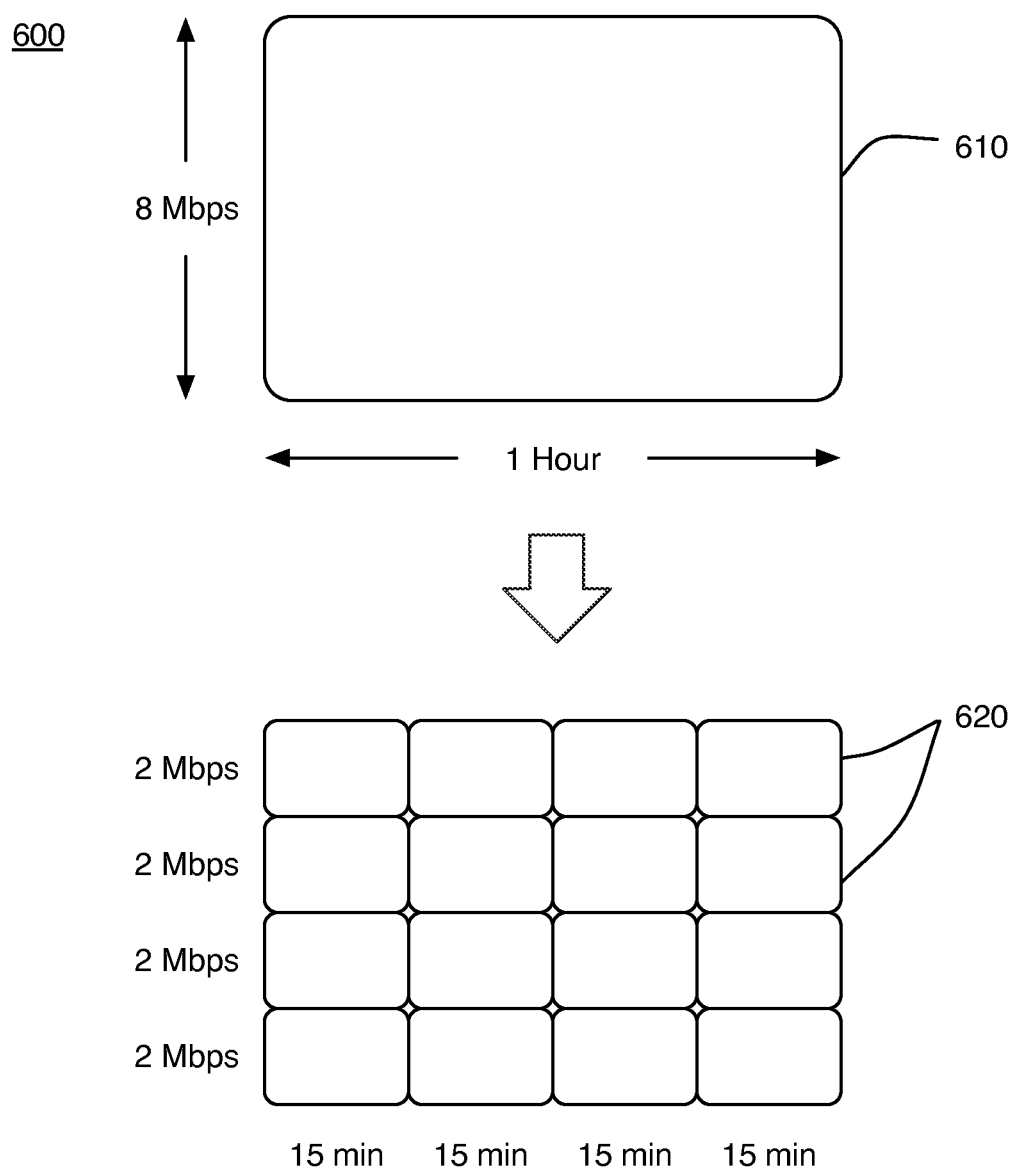
FIG. 6 is an illustration of an example method for segmenting a bandwidth submission.

As discussed herein, an in particular with respect to FIG. 2, bandwidth submissions from bandwidth providers may be pooled and/or arranged for auction. In general, the bandwidth submissions may be pooled and/or arranged in any suitable manner. In some examples, the pooling and/or arranging of bandwidth submissions may include segmenting one or more bandwidth submissions. FIG. 6 is an illustration of an example method 600 for segmenting a bandwidth submission, arranged in accordance with at least some embodiments of the present disclosure. Method 600 may include segmenting bandwidth submission 610 into a plurality of bandwidth segments 620. As shown, bandwidth submission 610 may include a bandwidth amount (8 Mbps in the example) and bandwidth duration (1 hour in the example) that may be segmented into 16 bandwidth segments 620 each having a common bandwidth amount (2 Mbps in the example) and bandwidth duration (15 minutes in the example). In some examples, bandwidth submission 610 may have a greater bandwidth amount and/or bandwidth duration than may be desired for a bandwidth auction. In some examples, the single bandwidth submission 610 may be segmented into a plurality of bandwidth segments 620 having a homogenous bandwidth amount and bandwidth duration in preparation for auction.

As discussed, in some examples, bandwidth submission 610 may be segmented into bandwidth segments having the same bandwidth amount and bandwidth duration. In some examples, bandwidth submission 610 may be segmented into bandwidth segments having different bandwidth amounts and/or bandwidth durations. In some examples, different auctions may have the same segmentation targets such that subsequent auctions may be predictable for auction users. In some examples, different auctions may have different segmentation targets. Such techniques may offer for auctions to be optimized for different times the auctions may be performed.

Figure 7:
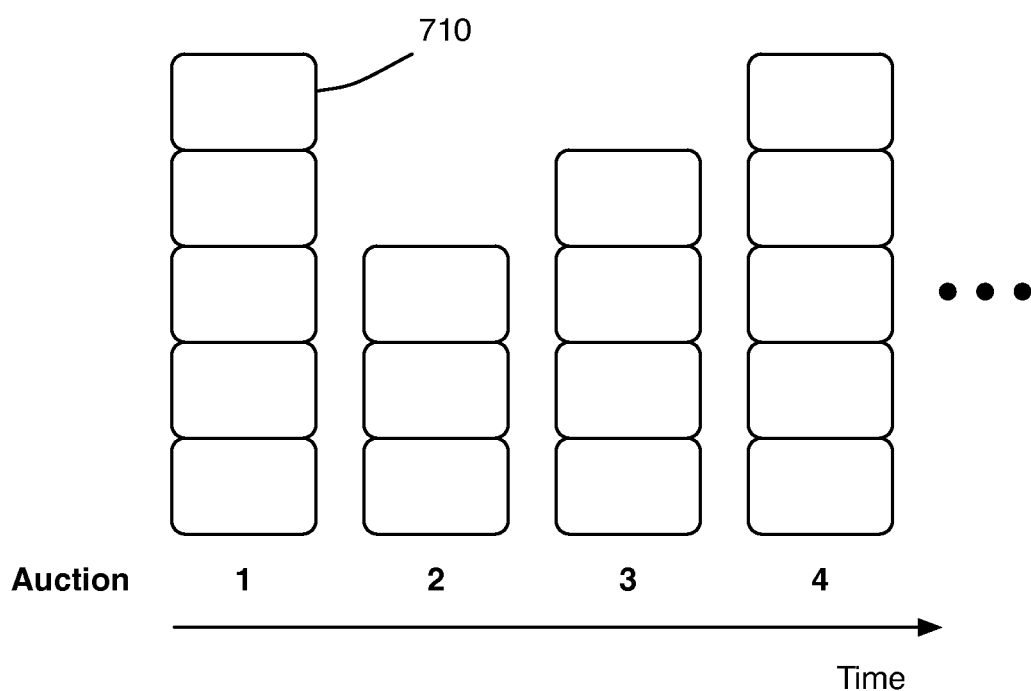
FIG. 7 is an illustration of an example method for providing a series of bandwidth auctions.

As discussed, a series of auctions on pooled bandwidth may be performed by an auction facilitator over time. FIG. 7 is an illustration of an example method 700 for providing a series of bandwidth auctions, arranged in accordance with at least some embodiments of the present disclosure. As shown, a series of auctions 1, 2, 3, 4, and so on of bandwidth segments 710 may be provided. Each auction 1, 2, 3, 4 may include one or more bandwidth segments from one or more bandwidth providers. The submitted bandwidth may be segmented (for examples, as discussed with respect to FIG. 6 and elsewhere herein), arranged according to time and pooled for auction. As shown, in some examples, each auction may include different numbers of available bandwidth segments. In some examples, each auction may include a number of available bandwidth segments based in part on the number and/or amount of received bandwidth submissions. In some examples, the number of bandwidth segments may be limited. In general, the bandwidth segments may include any amount of bandwidth and any suitable bandwidth durations. In the illustrated example, up to five segments may be shown for the sake of clarity of presentation. In some examples, one to five segments may be auctioned. In some examples, five to 50 segments may be auctioned. In some examples, 50 to 1,000 or more segments may be auctioned.

In general, the results or outcomes of auctions may vary widely. In some examples, all of the bandwidth segments may be sold at auction. In some examples, some bandwidth segments may be unsold at auction. In such instances, unsold bandwidth segments may be pooled again for a subsequent auction so long as the time of action precedes the time at which the bandwidth segment begins by duration that may allow the bandwidth purchaser to utilize the bandwidth. In some examples, bandwidth segments that have partially lapsed may be sold outside of the auction ad hoc at pro rata auction prices or discount prices. Such purchases may be communicated between the bandwidth purchaser and the bandwidth auction facilitator similarly to the techniques discussed herein. In some examples, unsold bandwidth segments may be withdrawn by the bandwidth provider prior to the start of a subsequent auction.

As shown in FIG. 7, auctions may be scheduled over time. The duration and frequency of auctions may include any suitable duration and/or frequency. In some examples, the auctions may be scheduled such that bandwidth segments that may be used relatively soon may be auctioned. Such scheduling may provide for substantially dynamic bandwidth use and may not allow for the need to re-pool substantial amounts of bandwidth. Such scheduling may also provide for the ability to quickly sell new supplies of bandwidth and to meet new bandwidth demands. In some examples, auctions may be held about 15 minutes apart. In some examples, auctions may be held about 30 minutes apart. In some examples, auctions may be held about 1 hour apart. In some examples, the auctions may be held and a substantially constant frequency. In some examples, auctions may be held at a varying frequency such that auctions may be held more frequently during times of relatively high demand and less frequently during times of relatively low demand.

As discussed herein, an auction of bandwidth may be provided by a bandwidth auction facilitator such that bandwidth providers may sell bandwidth to bandwidth purchasers. The techniques discussed herein provide a variety of advantages. In some examples, the techniques discussed herein may provide for increased Quality-of-Service (QoS) in congested areas during peak usage hours. For example, telecommunications providers may be bandwidth purchasers in the discussed techniques and may offload onto purchased Wi-Fi bandwidth users of 3rd generation mobile telecommunications (3G) networks. Such increased QoS may provide enhanced service for customers and, in areas where governments have provided penalties related to meeting QoS, may avoid penalties or fees, or the like. In some examples, the techniques discussed herein may offer telecommunications firms, corporate Wi-Fi networks, or users having available Wi-Fi the opportunity to profit from their networks. In particular, in instances where mobile 3G users (for example) may bid for Wi-Fi using the techniques discussed herein, the times of day may coincide with periods where Wi-Fi networks may be comparatively idle such as, for example, during commuting hours. As discussed herein, in some examples, the auction may be VCG auction. Such auctions may provide advantages such as, for example, reduced auction costs, ease of use for bandwidth providers and/or bandwidth purchasers, reliability.

FIG. 8 illustrates an example computer program product 800, arranged in accordance with at least some embodiments of the present disclosure. Computer program product 800 may include machine readable non-transitory medium having stored therein a plurality of instructions that, when executed, cause the machine to facilitate or participate in a bandwidth auction according to the processes and methods discussed herein. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some implementations, signal bearing medium 802 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). In some examples, signal bearing medium 802 may encompass a machine readable non-transitory medium.

Figure 9:
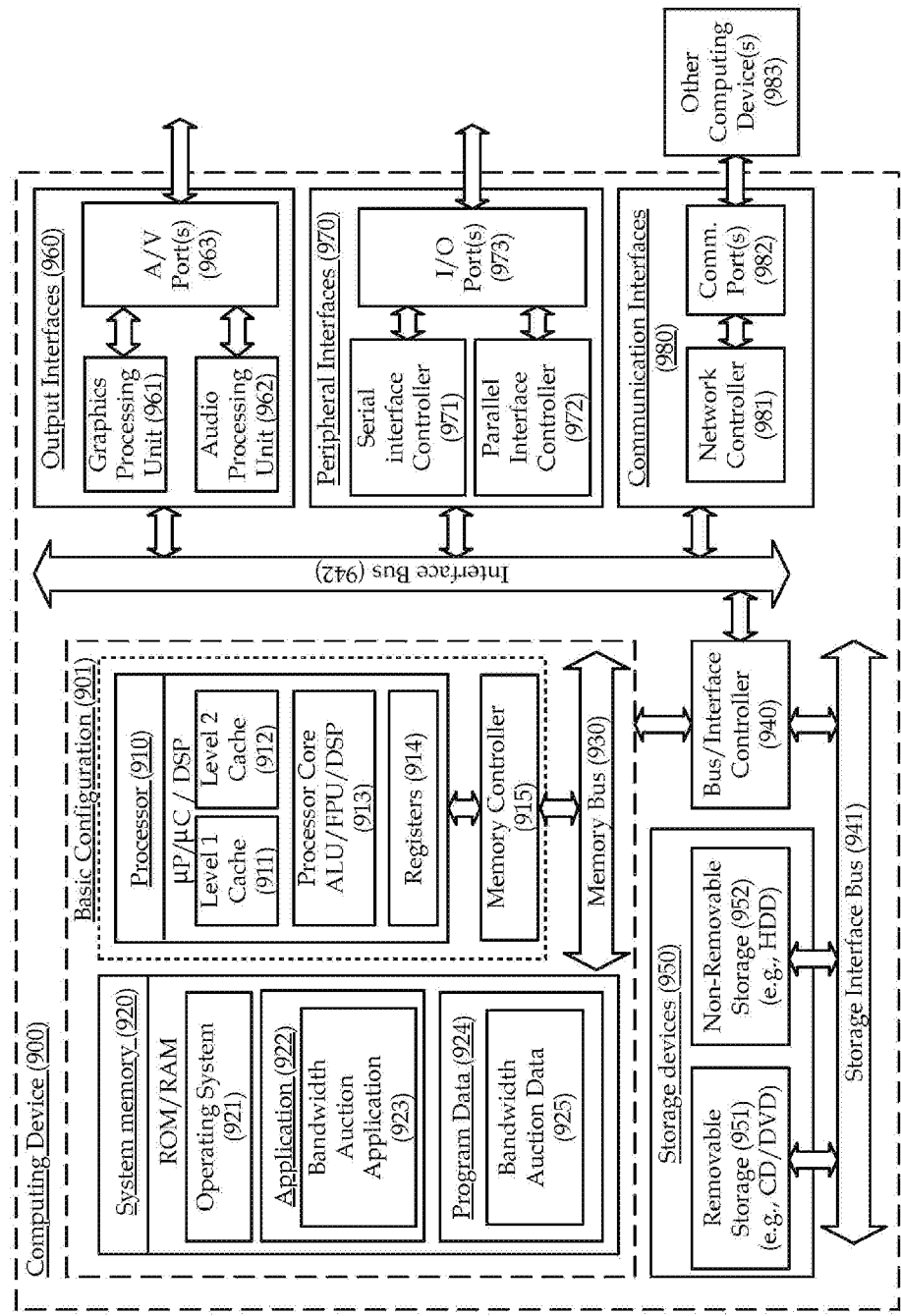
FIG. 9 is an illustration of a block diagram of an example computing device, all arranged in accordance with at least some embodiments of the present disclosure.

FIG. 9 is a block diagram illustrating an example computing device 900, arranged in accordance with at least some embodiments of the present disclosure. In various examples, computing device 900 may be configured to facilitate a bandwidth auction as discussed herein. In various examples, computing device 900 may be configured to participate in a bandwidth auction as a bandwidth purchaser as discussed herein. In various examples, computing device 900 may be configured to participate in a bandwidth auction as a bandwidth provider as discussed herein. In one example basic configuration 901, computing device 900 may include one or more processors 910 and system memory 920. A memory bus 930 can be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 can include one or more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include bandwidth auction application 923 that can be arranged to perform the functions, actions, and/or operations as described herein including the functional blocks, actions, and/or operations described herein. Program Data 924 may include bandwidth auction data 925 for use with bandwidth auction application 923. In some example embodiments, application 922 may be arranged to operate with program data 924 on an operating system 921. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more A/V ports 963. Example peripheral interfaces 970 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 983 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:
1. A method for a mobile device to participate in a bandwidth auction comprising:
   generating, by the mobile device, a bandwidth need notification in response to at least one of a prepaid quota being exhausted or a postpaid quota reaching a predetermined threshold;

providing, by the mobile device, in response to the bandwidth need notification, a table of applications including a plurality of applications of the mobile device, recommended bandwidth quantities for each of the plurality of applications, and recommended bandwidth bid prices for each of the plurality of applications based on successful past auctions;

receiving, by the mobile device, from a user, via the table, a first input selecting a first application among the plurality of applications and a first usage duration for the first application, and a second input selecting a second application among the plurality of applications and a second usage duration for the second application;

generating, by the mobile device, a bandwidth bid profile based on the selected first application and first usage duration for the first application, and the selected second application and second usage duration for the second application;

generating, by the mobile device, a bandwidth bid request based on the bandwidth bid profile and at least one of the recommended bandwidth bid prices;

transmitting, by the mobile device, the bandwidth bid request to a bandwidth auction provider, the bandwidth bid request including a requested bandwidth quantity, a requested bandwidth duration, a requested bandwidth bid price, and a requested bandwidth location;

receiving, by the mobile device, a bid win notification from the bandwidth auction provider, the bid win notification including a bandwidth bid win quantity, a bandwidth bid win duration, a bandwidth bid win location, a bandwidth bid win price, a bandwidth provider, and a bandwidth activation token, wherein the bandwidth activation token includes information that verifies a validity of a bandwidth request;

transmitting, by the mobile device, the bandwidth request including the bandwidth activation token to the bandwidth provider in response to the bid win notification; and receiving, by the mobile device, bandwidth from the bandwidth provider based at least in part on the bandwidth activation token, wherein a quantity, a duration, and a location of the received bandwidth matches the bandwidth bid win quantity, the bandwidth bid win duration, and the bandwidth bid win location.

2. The method of claim 1, further comprising:
receiving, at the mobile device, an indication of an available bandwidth auction from the bandwidth auction provider.

3. The method of claim 1, wherein the receiving the first input and the second input comprises receiving the first input and the second input from a touch screen of the mobile device.

4. The method of claim 1, further comprising:
transmitting a payment for the bandwidth.

5. The method of claim 4, wherein the payment is transmitted to at least one of the bandwidth auction provider or the bandwidth provider.

6. The method of claim 4, wherein the payment comprises at least one of a currency based payment or a virtual currency based payment.

7. The method of claim 1, wherein the bandwidth comprises wireless bandwidth.

8. The method of claim 1, wherein the plurality of applications include a mobile voice call, a text-based email, a low-quality music stream, a medium-quality music stream, a high-quality music stream, a video conferencing, an entry-level high speed internet, a basic-high speed internet, an enhanced-high speed internet, a responsive web browsing, streaming video, a telecommuting, a gaming, an enterprise application, a standard definition TV, a high definition TV, a distance learning, or a multi-media web interaction.

9. The method of claim 1, wherein the requested bandwidth location is automatically generated by the mobile device based at least in part on global positioning system information.

10. A mobile device configured to participate in a bandwidth auction comprising:
at least one processor and memory, the at least one processor configured to:
generate a bandwidth need notification in response to at least one of a prepaid quota being exhausted or a postpaid quota reaching a predetermined threshold;
provide, in response to the bandwidth need notification, a table of applications including a plurality of applications of the mobile device, recommended bandwidth quantities for each of the plurality of applications, and recommended bandwidth bid prices for each of the plurality of applications based on successful past auctions;
receive, from a user, via the table, a first input to select a first application among the plurality of applications and a first usage duration for the first application, and a second input to select a second application among the plurality of applications and a second usage duration for the second application;
generate a bandwidth bid profile based on the selected first application and first usage duration for the first application, and the selected second application and second usage duration for the second application;
generate a bandwidth bid request based on the bandwidth bid profile and at least one of the recommended bandwidth bid prices;
transmit the bandwidth bid request to a bandwidth auction provider, the bandwidth bid request including a requested bandwidth quantity, a requested bandwidth duration, a requested bandwidth bid price, and a requested bandwidth location;
receive a bid win notification from the bandwidth auction provider, the bid win notification including a bandwidth bid win quantity, a bandwidth bid win duration, a bandwidth bid win location, a bandwidth bid win price, a bandwidth provider, and a bandwidth activation token, wherein the bandwidth activation token includes information that verifies a validity of a bandwidth request;
transmit the bandwidth request including the bandwidth activation token to the bandwidth provider in response to the bid win notification; and
receive bandwidth from the bandwidth provider based at least in part on the bandwidth activation token, wherein a quantity, a duration, and a location of the received bandwidth matches the bandwidth bid win quantity, the bandwidth bid win duration, and the bandwidth bid win location.

11. A non-transitory computer-readable medium that stores executable-instructions that, when executed, cause a mobile device to perform operations comprising:
generating a bandwidth need notification in response to at least one of a prepaid quota being exhausted or a postpaid quota reaching a predetermined threshold;
providing, in response to the bandwidth need notification, a table of applications including a plurality of applications of the mobile device, recommended bandwidth quantities for each of the plurality of applications, and recommended bandwidth bid prices for each of the plurality of applications based on successful past auctions;

receiving, by the mobile device, from a user, via the table, a first input selecting a first application among the plurality of applications and a first usage duration for the first application, and a second input selecting a second application among the plurality of applications and a second usage duration for the second application;

generating a bandwidth bid profile based on the selected first application and first usage duration for the first application, and the selected second application and second usage duration for the second application;

generating a bandwidth bid request based on the bandwidth bid profile and at least one of the recommended bandwidth bid prices;

transmitting the bandwidth bid request to a bandwidth auction provider, the bandwidth bid request including a requested bandwidth quantity, a requested bandwidth duration, a requested bandwidth bid price, and a requested bandwidth location;

receiving a bid win notification from the bandwidth auction provider, the bid win notification including a bandwidth bid win quantity, a bandwidth bid win duration, a bandwidth bid win location, a bandwidth bid win price, a bandwidth provider, and a bandwidth activation token, wherein the bandwidth activation token includes information that verifies a validity of a bandwidth request;

transmitting the bandwidth request including the bandwidth activation token to the bandwidth provider in response to the bid win notification; and receiving bandwidth from the bandwidth provider based at least in part on the bandwidth activation token, wherein a quantity, a duration, and a location of the received bandwidth matches the bandwidth bid win quantity, the bandwidth bid win duration, and the bandwidth bid win location.

\* \* \* \* \*